US008755131B2

(12) United States Patent
Kuo (10) Patent No.: US 8,755,131 B2
(45) Date of Patent: Jun. 17, 2014

(54) OPTICAL LENS ASSEMBLY FOR CAPTURING IMAGES AND IMAGE CAPTURE DEVICE THEREWITH

(75) Inventor: Jui-Hsiung Kuo, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/544,841

(22) Filed: Jul. 9, 2012

(65) Prior Publication Data

US 2013/0308033 A1 Nov. 21, 2013

(30) Foreign Application Priority Data

May 18, 2012 (TW) .............................. 101117932 A (51) Int. Cl.
*G02B 3/02* (2006.01)
*G02B 15/14* (2006.01)
*G02B 26/08* (2006.01)

(52) U.S. Cl.
USPC .......................... 359/715; 359/686; 359/201.1

(58) Field of Classification Search
USPC ........................... 359/680–682, 686, 715, 678
See application file for complete search history.

(56) References Cited

U.S. PATENT DOCUMENTS

| 2004/0169764 A1* | 9/2004 | Ishii et al. ...................... 348/340 |
| 2006/0158742 A1* | 7/2006 | Mihara ......................... 359/676 |
| 2010/0208358 A1* | 8/2010 | Minefuji ....................... 359/682 |

* cited by examiner

*Primary Examiner* — Scott J Sugarman
*Assistant Examiner* — Mustak Choudhury
(74) *Attorney, Agent, or Firm* — Muncy, Geissler, Olds & Lowe, P.C.

(57) ABSTRACT

The invention is an optical lens assembly for capturing images and an image capture device therewith. The optical lens assembly for capturing images includes, along an optical axis, a total reflection prism, a first lens group having negative focal power, wherein the first lens group comprises a lens having negative focal power, a second lens group having positive focal power, wherein the second lens group comprises at least one lens having an aspherical optical surface, a third lens group having positive focal power, wherein the third lens group comprises at least one lens having positive focal power and at least one lens having negative focal power, and a fourth lens group having positive focal power, wherein the fourth lens group comprises at least one lens having an aspherical optical surface. Thereby, the aberration can be improved and a thin lens module for capturing images can be achieved.

8 Claims, 9 Drawing Sheets

OPTICAL LENS ASSEMBLY FOR CAPTURING IMAGES AND IMAGE CAPTURE DEVICE THEREWITH

BACKGROUND OF THE INVENTION

1. Field of the Invention

The present invention relates to an optical lens assembly for capturing images and an image capture device therewith, and more particularly, to an optical lens assembly for capturing images, composed of a prism and four sets of optical lenses, and an image capture device therewith so as to be applied to a thin image capture system.

2. Description of the Related Art

A periscopic optical lens assembly for capturing images is widely arranged in a miniaturized electronic device, such as digital camera, mobile phone camera or web camera. Typically, the periscopic optical lens assembly is a various-focus type and is used for capturing images to objects. The optical lens assembly for capturing images is developed to become thin and of low cost and to have a good aberration correction capability, high resolution and high image quality.

With regards to a traditional optical lens assembly for capturing images, an additional lens having a concave surface at an image side of the lens or an additional crescent-shaped lens having a convex surface at an object side of the crescent-shaped lens is arranged to provide upmost light-gathering power. However, the above additional lens has such a thickness that thinning the overall volume is not easy, and the additional lens is led to have increased costs. Besides, in order to provide relatively much light-gathering power, curvature at the concave optical surface may change so large to be difficultly manufactured and cost-consuming. In order to overcome the shortcomings of prior art, there should be an improved design for compensating aberration and constraining the full length of an optical lens assembly for capturing images to be applied to a thin image capture device. Accordingly, the present invention proposes a relatively practical design employing a combination of focal powers, convex surfaces and concave surfaces of four sets of lenses so as to create high-quality images and reduce costs. Further, the design can be applied to a thin image capture device.

Based on the aforementioned problems, the present invention proposes an optical lens assembly for capturing images and an image capture device therewith to improve the shortcomings of prior art and to enhance industrial application.

SUMMARY OF THE INVENTION

In order to improve the above-mentioned problems of prior art, the present invention is directed to an optical lens assembly for capturing images and an image capture device therewith so as to solve the increased costs and the difficulty in a thinning tendency.

In accordance with the present invention, an optical lens assembly for capturing images includes, in sequence along an optical axis, a prism which is a total reflection prism, a first lens group having negative focal power, wherein the first lens group comprises at least one lens having negative focal power, a second lens group having positive focal power, wherein the second lens group comprises at least one lens having an aspherical optical surface, a third lens group having positive focal power, wherein the third lens group comprises at least one lens having positive focal power and at least one lens having negative focal power, and a fourth lens group having positive focal power, wherein the fourth lens group comprises at least one lens having an aspherical optical surface. The second lens group has a focal length $f_2$, and the third lens group has a focal length $f_3$, wherein the optical lens assembly for capturing images satisfies the following relation:

$$0.4 < f_3/f_2 < 0.7$$

In an embodiment, the prism may be the lens closest to an object and have an incident optical surface, a reflecting surface and an exit optical surface, wherein the reflecting surface is set as a mirror surface by a total reflection coating.

In an embodiment, along the optical axis the first lens group may comprise a first lens, the second lens group comprises a second lens, the third lens group comprises a third lens, a fourth lens and a fifth lens, and the fourth lens group comprises a sixth lens.

In an embodiment, the first lens may have negative focal power, the third lens may have positive focal power, and the sixth lens may have negative focal power.

In an embodiment, the second lens may have a first aspherical optical surface and a second aspherical optical surface, and the third lens may have a first aspherical optical surface.

In accordance with the present invention, an image capture device includes, in sequence along an optical axis, a prism, wherein the prism is a reflection prism, a first lens group having negative focal power, wherein the first lens group comprises at least one lens having negative optical focal power, a second lens group having positive focal power, wherein the second lens group comprises at least one lens having an aspherical optical surface, a third lens group having positive focal power, wherein the third lens group comprises at least one lens having positive focal power and at least one lens having negative focal power, a fourth lens group having positive focal power, wherein the fourth lens group comprises at least one lens having an aspherical optical surface, and an image sensor at an imaging plane of the image capture device so as to image an object. The second lens group has a focal length $f_2$, and the third lens group has a focal length $f_3$, wherein the image capture device satisfies the following relation:

$$0.4 < f_3/f_2 < 0.7$$

In an embodiment, the prism may be the lens closest to the object and has an incident optical surface, a reflecting surface and an exit optical surface, wherein the reflecting surface is a mirror surface formed by a total reflection coating.

In an embodiment, along the optical axis the first lens group may comprise a first lens, the second lens group comprises a second lens, the third lens group comprises a third lens, a fourth lens and a fifth lens, and the fourth lens group comprises a sixth lens.

In an embodiment, the first lens may have negative focal power, the third lens may have positive focal power, and the sixth lens may have negative focal power.

In an embodiment, the second lens may have a first aspherical optical surface and a second aspherical optical surface, and the third lens may have a first aspherical optical surface.

In summary, in accordance with the present invention, the optical lens assembly for capturing images and the image capture device therewith has the following advantages:

1. The optical lens assembly for capturing images and the image capture device therewith employ the total reflection prism to reflect an image light of the object such that a miniaturization purpose can be achieved.

2. The optical lens assembly for capturing images and the image capture device therewith have the prism and the first, second third and fourth lens groups to be arranged in the optical axis and with suitable spaces therebetween so as to have a good aberration correction and an advantageous optical modulation transfer function (MTF), and have a lens head that can be effectively reduced.

DETAILED DESCRIPTION OF THE PREFERRED EMBODIMENTS

Illustrative embodiments accompanying with figures are now described below to lead the characteristics, contents, advantages and effects of the invention to be understood by the Examiner. Figures are illustrated only for explanation, but are not drawn to scale and precise arrangement, and thus the scope of the invention should not be limited by the scale and arrangement illustrated in the figures.

Figure 1:
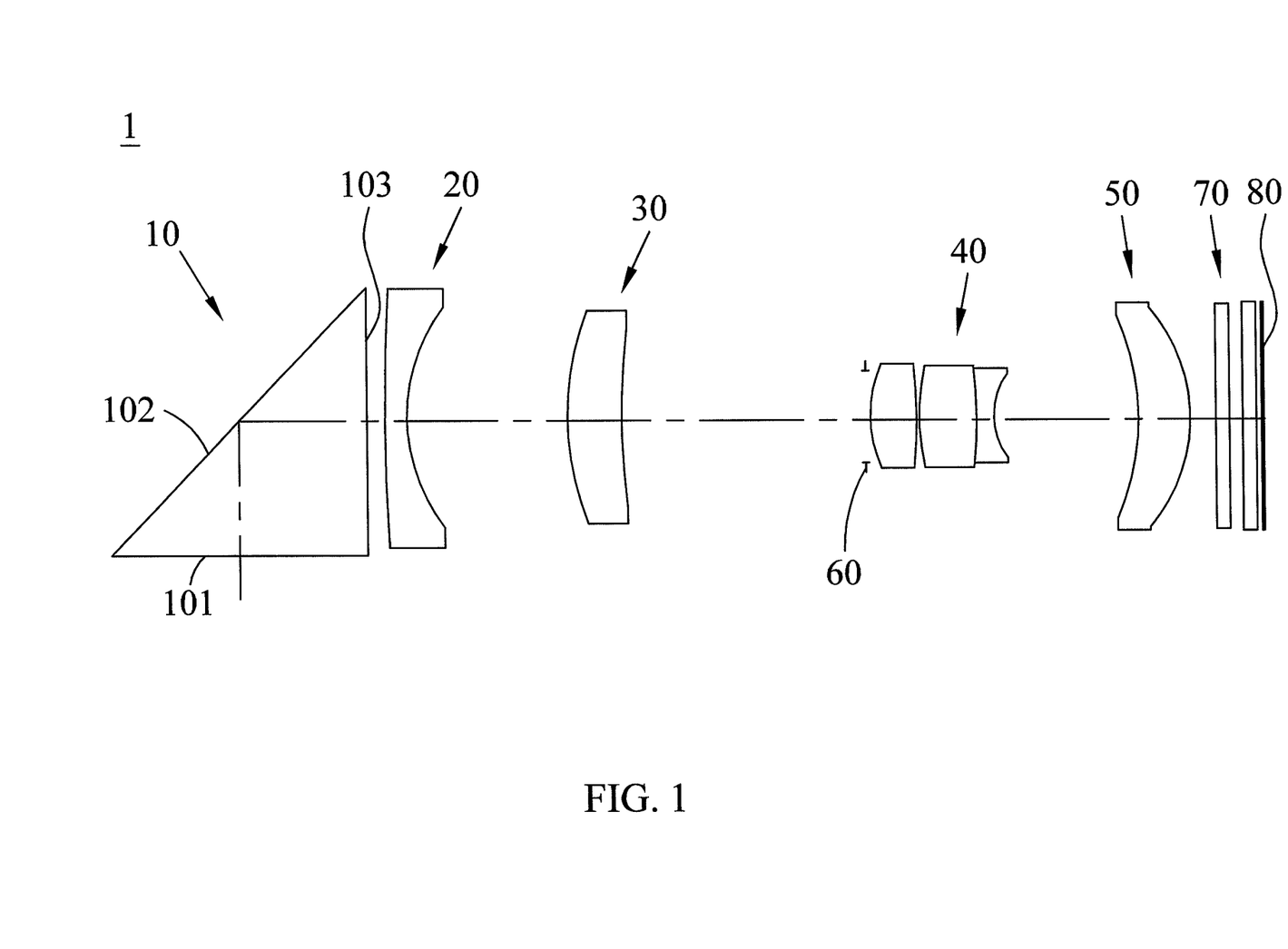
FIG. 1 is a schematic view of an optical lens assembly for capturing images in accordance with the present invention.
Figure 2:
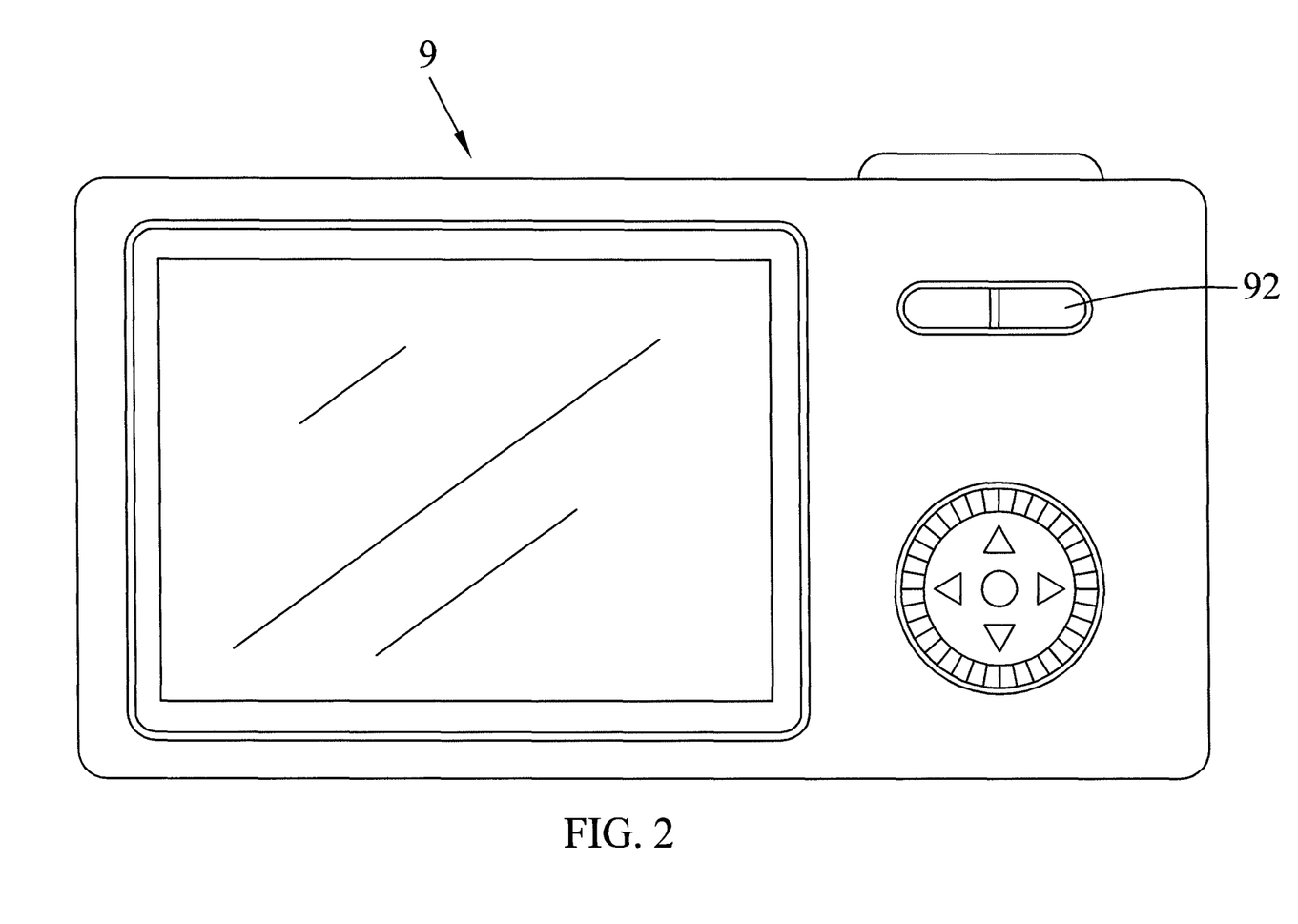
FIG. 2 is a first schematic view of an image capture device in accordance with the present invention.
Figure 3:
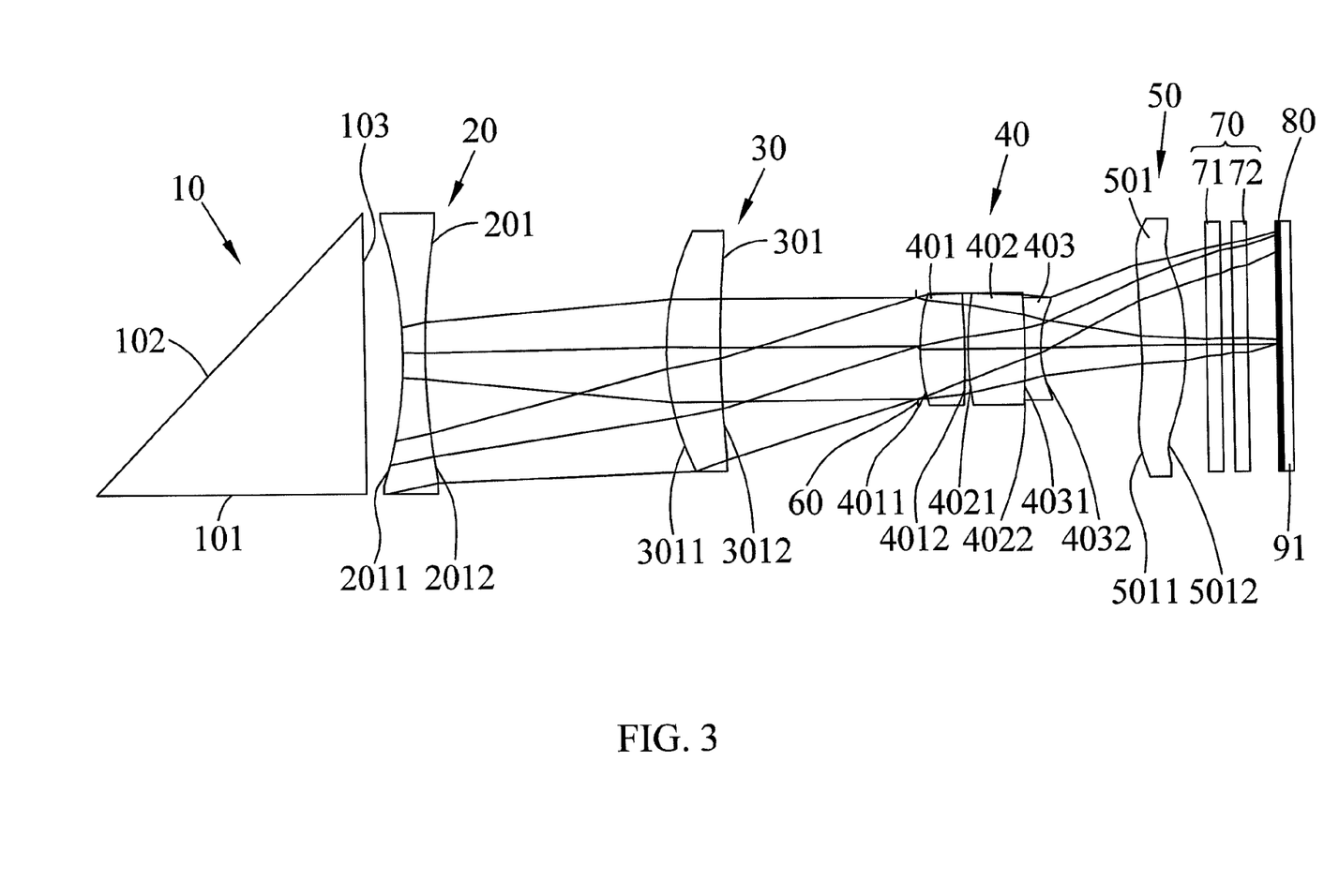
FIG. 3 is a second schematic view of an image capture device in accordance with the present invention.
Figure 4:
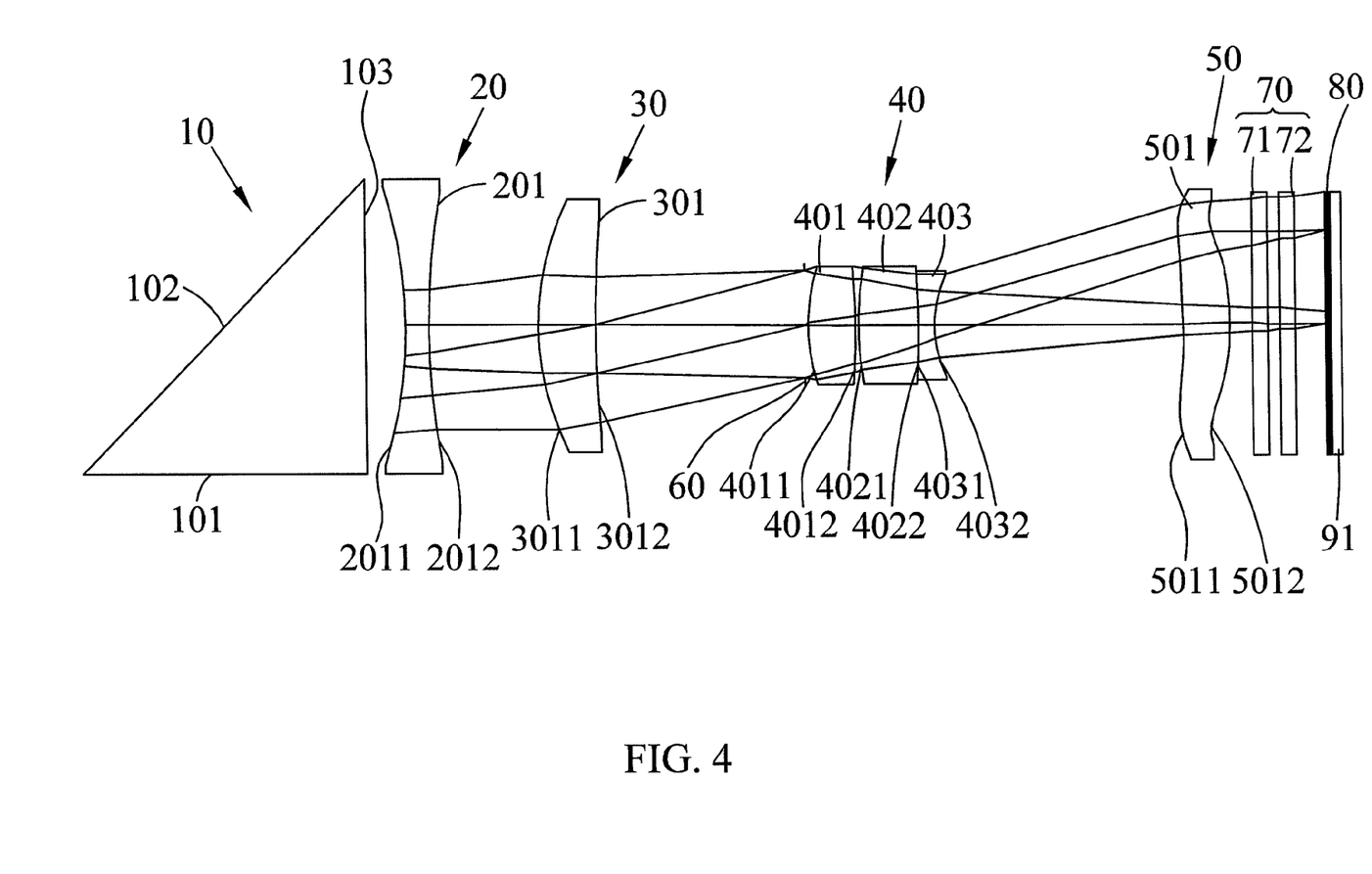
FIG. 4 is a third schematic view of an image capture device in accordance with the present invention.
Figure 5:
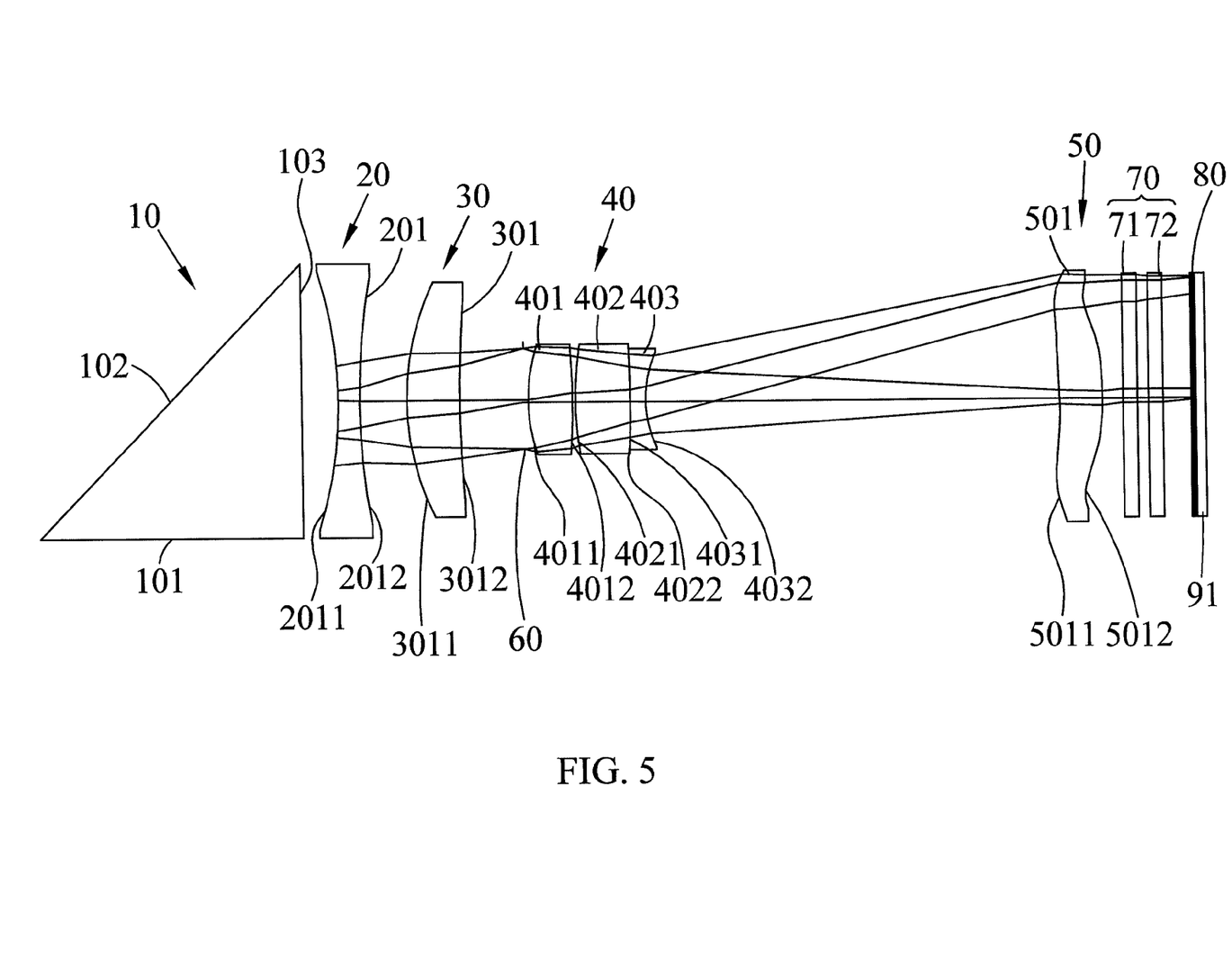
FIG. 5 is a fourth schematic view of an image capture device in accordance with the present invention.
Figure 6:
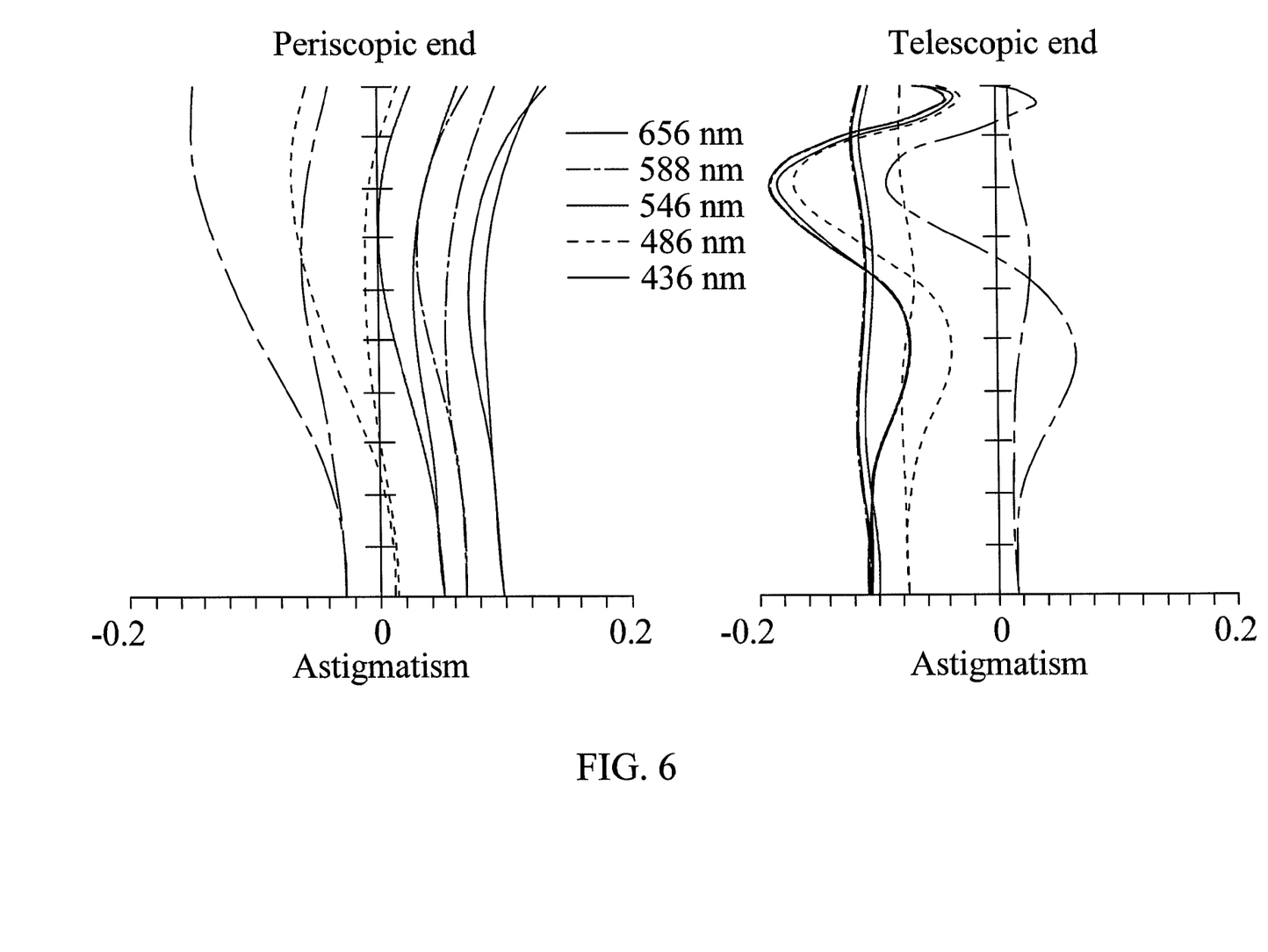
FIG. 6 is a diagram of astigmatism curves of an optical lens assembly for capturing images in accordance with the present invention.
Figure 7:
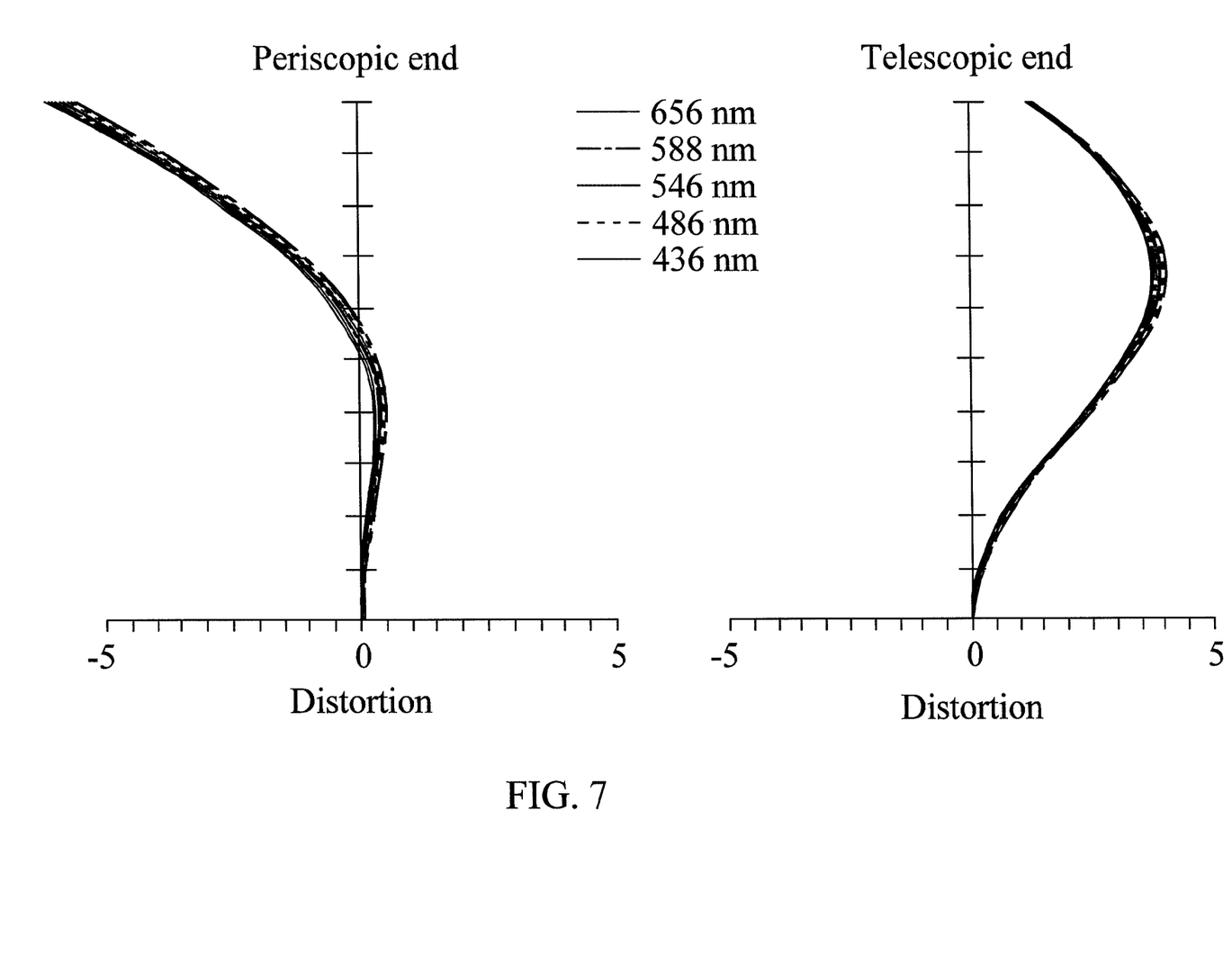
FIG. 7 is a diagram of distortion curves of an optical lens assembly for capturing images in accordance with the present invention.
Figure 8:
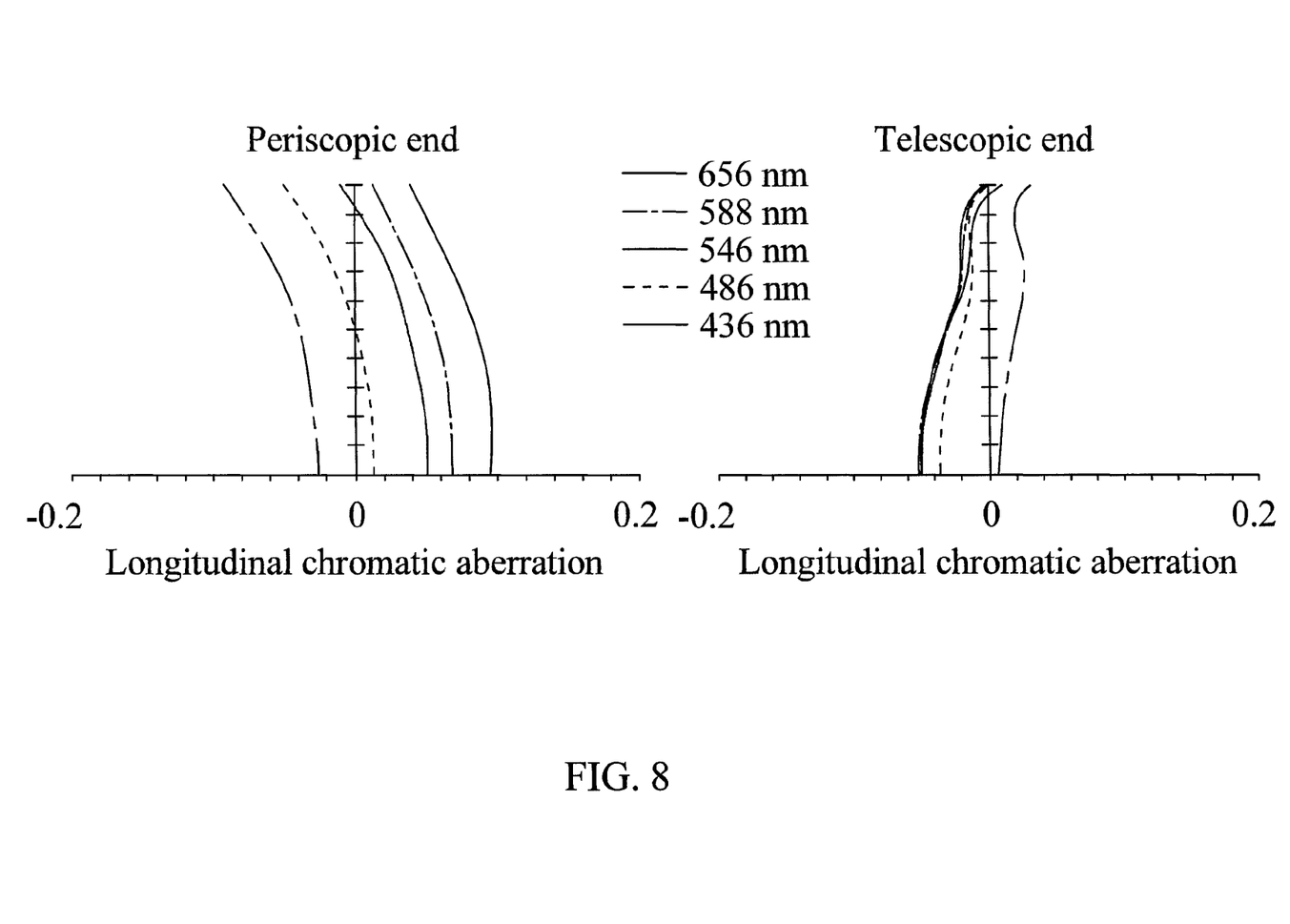
FIG. 8 is a diagram of longitudinal-chromatic-aberration curves of an optical lens assembly for capturing images in accordance with the present invention.
Figure 9:
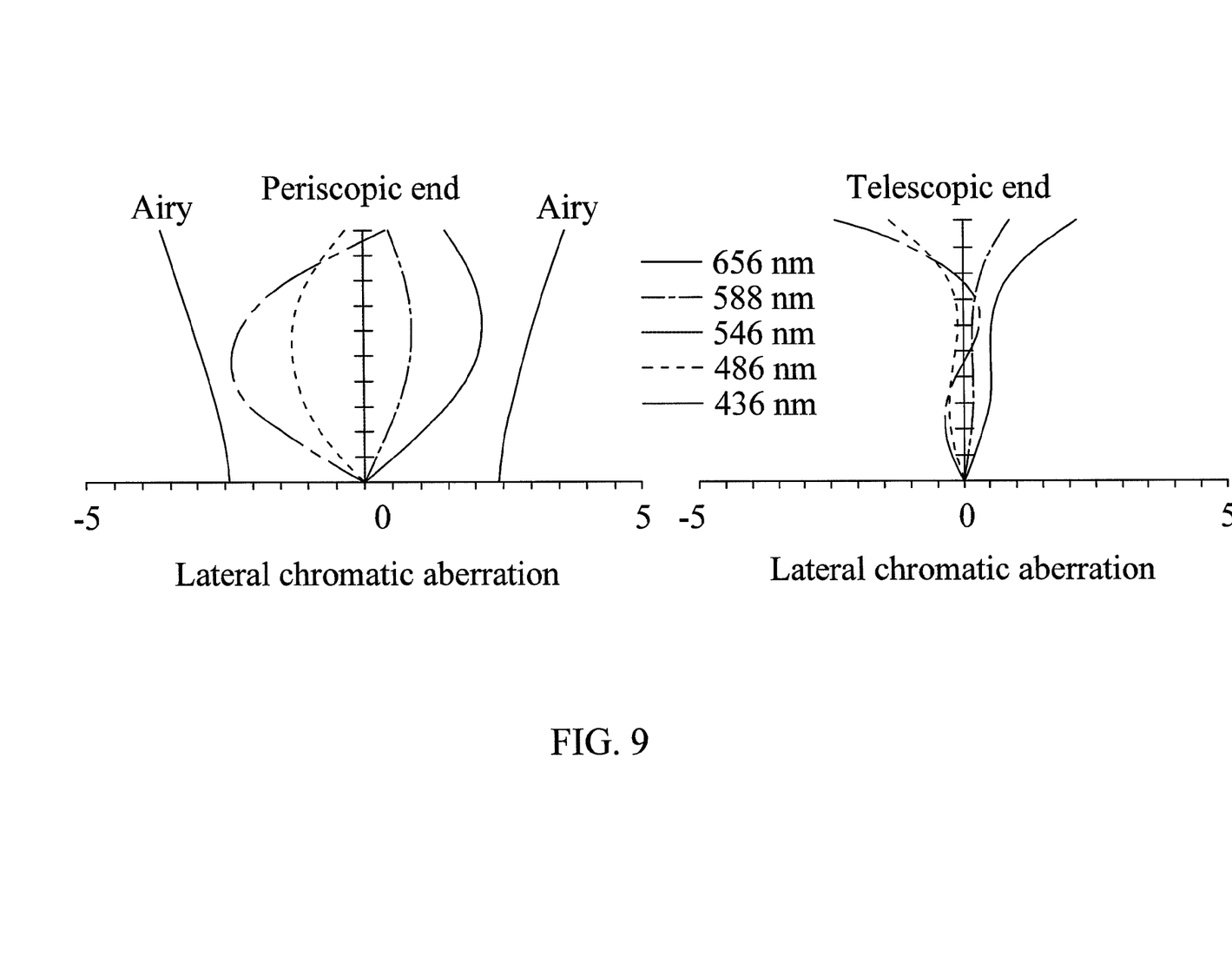
FIG. 9 is a diagram of lateral-chromatic-aberration curves of an optical lens assembly for capturing images in accordance with the present invention.

FIG. 1 is a schematic view of an optical lens assembly for capturing images in accordance with the present invention. Referring to FIG. 1, an optical lens assembly 1 for capturing images is suitable for a zoomable lens of a digital camera and more particularly, for a zoomable periscopic lens. The optical lens assembly for capturing images 1 includes, in sequence along an optical axis, a prism 10, a first lens group 20 having negative focal power, wherein the first lens group 20 comprises at least one lens having negative focal power, a second lens group 30 having positive focal power, wherein the second lens group 30 comprises at least one lens having an aspherical optical surface, a third lens group 40 having positive focal power, wherein the third lens group 40 comprises at least one lens having a positive focal optical power and at least one lens having negative focal power, and a fourth lens group 50 having positive focal power, wherein the fourth lens group 50 comprises at least one lens having an aspherical optical surface. When the second lens group 30 and the third lens group 40 move axially along the optical axis, the optical lens assembly for capturing images 1 has a changeable focal length.

The optical lens assembly for capturing images 1 satisfies the following relation: $0.4 < f_3/f_2 < 0.7$, wherein $f_2$ is a focal length of the second lens group 30 and equals 13.25 in this embodiment without limitation, wherein $f_3$ is a focal length of the third lens group 40 and equals 5.87 in this embodiment without limitation. In case that the focal length $f_2$ of the second lens group 30 and the focal length $f_3$ of the third lens group 40 satisfy the relation, the second lens group 30 and the third lens group 40 can be led to be balanced within a specific condition range. This is beneficial to suitable arrangements for focal powers of the second lens group 30 and the third lens group 40. Thereby, the whole of the optical lens assembly for capturing images 1 can be provided with suitable focal power and with improved aberration correction.

The prism 10 has an incident optical surface 101, a reflecting surface 102 and an exit optical surface 103, wherein the reflecting surface 102 is set as a mirror surface by a total reflection coating. After passing into the optical lens assembly for capturing images 1 through the incident optical surface 101, an image light of an object can be reflected by the reflecting surface 102 and then emitted from the exit optical surface 103. Next, the image light of the object can pass through, in sequence, the first lens group 20, the second lens group 30, an aperture 60, the third lens group 40, the fourth lens group 50 and an optical filter 70, and finally can be imaged on an image plane 80. The prism 10 can be shaped like a right triangle having a hypotenuse set for the reflecting surface 102.

In this embodiment, the first lens group 20 having negative focal power can increase a field angle. The combination with the first lens group 20 and the second lens group 30 having positive focal power can enlarge the magnification and enhance the resolution. The third and fourth lens groups 40 and 50 having positive focal power can compensate the aberration created by the first lens group 20 and the second lens group 30 such that the aberration and distortion can meet requirements of the resolution.

Besides, the optical lens assembly for capturing images 1 may include the aperture 60 arranged between the second lens group 30 and the third lens group 40, and at least one optical filter 70 arranged between the fourth lens group 50 and the image plane 80, wherein the optical filter 70 can filter a light having a specific wave length, and may preferably be an infrared filter. The optical filter 70 is generally formed of a planar optical material and has no impacts on the focal length of the optical lens assembly for capturing images 1.

Referring to FIGS. 2-5, in this embodiment, similar descriptions are not repeated. An image capture device 9 includes an image capture lens composed of the optical lens assembly for capturing images 1, and an image sensor 91. The optical lens assembly for capturing images 1 includes the prism 10 arranged at a side of the optical axis closest to an object, the first lens group 20 comprising a first lens 201 having negative focal power, wherein the first lens 201 has a first concave optical surface 2011 and a second concave optical surface 2012, the second lens group 30 comprising a second lens 301 having positive focal power, wherein the second lens 301 has a first convex optical surface 3011 and a second concave optical surface 3012, wherein the first convex optical surface 3011 and the second concave optical surface 3012 are aspherical surfaces, the third lens group 40 comprising, in sequence along the optical axis, a third lens 401 having positive focal power, a fourth lens 402 having positive focal power and a fifth lens 403 having negative focal power, wherein the third lens 401 is provided with a first aspherical convex optical surface 4011 and a second convex optical surface 4012, wherein the fourth lens 402 is provided with a first convex optical surface 4021 and a second concave optical surface 4022, wherein the fifth lens 403 is provided with a first convex optical surface 4031 and a second concave optical surface 4032, the fourth lens group 50 comprising a sixth lens 501 having positive focal power, wherein the sixth lens 501 is provided with a first concave optical surface 5011 and a second convex optical surface 5012. In the present embodiment, the optical filter 70 comprising a first optical filter 71 and a second optical filter 72, wherein the optical filter 70 is formed of a glass plane for adjusting wave-length sections of an image light. The image sensor 91 may be arranged on the image plane 80 of the optical lens assembly for capturing images 1 such that the image light of the object can pass through a combination of the four lens groups, the aperture 60 and the optical filter 70, and finally can be imaged on the image sensor 91.

Referring to the following Table 1 illustrating optics data of the embodiment, When a user push a zoom button 92 for a periscopic or telescopic action, a zoom module is driven to move the second lens group 30 and the third lens group 40 so as to adjust a relative distance between the second lens group 30 and the third lens group 40 or a relative distance between the first lens group 20 or the fourth lens group 50 and the second lens group 30 and the third lens group 40. Thereby, zooming can be achieved. In this embodiment, two zooming processes are performed. In the beginning, an initial focal length f equals 4.1, a distance in the optical axis between the first lens group 20 and the second lens group 30 equals 1.259, and the third lens group 40 has respective distances of 5.832 and 3.306 in the optical axis to the second lens group 30 and the fourth lens group 50, respectively. At this time, an aperture value or f-number (Fno) equals 3.7. In the first zooming process, a focal length f equals 7.06, a distance in the optical axis between the first lens group 20 and the second lens group 30 equals 1.259, and the third lens group 40 has respective distances of 4.686 and 6.058 in the optical axis to the second lens group 30 and the fourth lens group 50, respectively. At this time, an aperture value or f-number (Fno) equals 5.4. In the second zooming process, a focal length f equals 11.8, a distance in the optical axis between the first lens group 20 and the second lens group 30 equals 1.459, and the third lens group 40 has respective distances of 1.431 and 9.237 in the optical axis to the second lens group 30 and the fourth lens group 50, respectively. At this time, an aperture value or f-number (Fno) equals 7.3.

TABLE 1 illustrating optics data of the embodiment
f = 4.3~7.06~11.8 mm, Fno = 3.7~5.4~7.3

| Optical surface | | Radius of curvature | Thickness or distance | Refractive index | Coefficient of dispersion |
|---|---|---|---|---|---|
| 0 | Object | | | | |
| 1 | Incident surface of prism | ∞ | 6.5 | 1.85 | 23.8 |
| 2 | Reflecting surface of prism | ∞ | 6.5 | 1.85 | 23.8 |
| 3 | Exit surface of prism | ∞ | 0.3 | | |
| 4 | | −18.152 | 0.5 | 1.729 | 54.680 |
|   | First lens | | | | |
| 5 | | 4.592 | A | | |
| 6 | | 3.690(ASP) | 1.2 | 1.534 | 55.994 |
|   | Second lens | | | | |
| 7 | | 6.794(ASP) | B | | |
| 8 | Aperture | ∞ | 0.1 | | |
| 9 | | 2.701(ASP) | 1 | 1.534 | 55.994 |
|   | Third lens | | | | |
| 10 | | −10.594 | 0.1 | | |
| 11 | | 4.589 | 1.2 | 1.772 | 60.099 |
|   | Fourth lens | | | | |
| 12 | | 5.277 | 0.005 | 1.560 | 55.000 |
| 13 | | 5.277 | 0.4 | 1.698 | 23.799 |
|   | Fifth lens | | | | |

TABLE 1-continued illustrating optics data of the embodiment
f = 4.3~7.06~11.8 mm, Fno = 3.7~5.4~7.3

| Optical surface | | Radius of curvature | Thickness or distance | Refractive index | Coefficient of dispersion |
|---|---|---|---|---|---|
| 14 | | 1.684 | C | | |
| 15 | | −5.017 | 1.2 | 1.534 | 55.994 |
|   | Sixth lens | | | | |
| 16 | | −2.949 | 0.5 | | |
| 17 | | ∞ | 0.3 | 1.516 | 64.142 |
|   | First optical filter | | | | |
| 18 | | ∞ | 0.3 | | |
| 19 | Second optical | ∞ | 0.3 | 1.516 | 64.142 |
| 20 | filter | ∞ | 0.2 | | |

PS.: ASP means aspherical;
when f = 4.3, A is 2.857, B is 5.832, and C is 3.306;
when f = 7.06, A is 1.259, B is 4.686, and C is 6.058;
when f = 11.8, A is 1.459, B is 1.431, and C is 9.237.

The aspherical optical surfaces can be obtained using an aspherical surface formula. Aspherical coefficients are listed in the following Table 2. The aspherical surface formula is widely known by those skilled in the art and is not repeated herein.

TABLE 2 illustrating aspheric coefficients in accordance with the embodiment
Aspheric Coefficients

| Surface # | 6 | 7 | 9 |
|---|---|---|---|
| k = | 0.4276 | 0.552 | −1.263 |
| A4 = | 0.00125 | 0.00448 | 0.00180 |
| A6 = | 0.000471 | 0.000886 | −0.00156 |
| A8 = | −0.000135 | −0.000277 | 0.00132 |
| A10 = | 3.396 | 0.000106 | −0.000395 |

Referring to the optics data of Table 1 and the diagrams of FIGS. 6-9, in accordance with the present invention, astigmatism, distortion, longitudinal chromatic-aberration and lateral chromatic-aberration can be well compensated.

Besides, the lenses of the optical lens assembly for capturing images 1 can be made of glass or plastic. In case the lenses are made of plastic, it is cost-effective. In case the lenses are made of glass, the optical lens assembly for capturing images 1 has focal power arranged with increased freedom degrees. Besides, the lens may be arranged with an aspherical optical surface and can be easily made with a shape except a spherical surface so as to obtain relatively numerous control variables for reducing the abberation, the number of lenses and the total length of the optical lens assembly for capturing images 1. Besides, in accordance with the present invention, the optical lens assembly for capturing images 1 can be arranged with an aperture stop, such as glare stop or field stop, used to reduce stray light. Thereby, a quality of images can be improved.

With regards to the optical lens assembly for capturing images 1 and the image capture device therewith, the lens when illustrated to have a convex surface means to have a convex surface close to the axis, and the lens when illustrated to have a concave surface means to have a concave surface close to the axis.

Table 1 and Table 2 illustrate changes in different values in accordance with the optical lens assembly for capturing images 1 and the image capture device therewith of the present invention. These changes in different values are obtained from experiments. Even though different values are employed, products having similar structures are within the scope of the invention. The above specifications accompanying with figures are illustrated only for embodiments, and should not limit claims of the invention.

What is claimed is:

1. An optical lens assembly for capturing images, comprising, in sequence along an optical axis:
    a prism, being a total reflection prism, wherein the prism is a lens close to an object and the prism has an incident optical surface, a reflecting surface and an exit optical surface, and wherein the reflecting surface is a mirror surface formed by a total reflection coating;
    a first lens group having negative focal power, and comprising at least one lens having negative focal power;
    a second lens group having positive focal power, and comprising at least one lens having an aspherical optical surface;
    a third lens group having positive focal power, and comprising at least one lens having positive focal power and at least one lens having negative focal power; and
    a fourth lens group having positive focal power, and comprising at least one lens having an aspherical optical surface, wherein the second lens group has a focal length $f_2$, the third lens group has a focal length $f_3$, and the optical lens assembly for capturing images satisfies the following relation:

$0.4 < f_3/f_2 < 0.7$.

2. The optical lens assembly for capturing images of claim 1, wherein along the optical axis the first lens group comprises a first lens, the second lens group comprises a second lens, the third lens group comprises a third lens, a fourth lens and a fifth lens, and the fourth lens group comprises a sixth lens.

3. The optical lens assembly for capturing images of claim 2, wherein the first lens has negative focal power, the third lens has positive focal power, and the sixth lens has positive focal power.

4. The optical lens assembly for capturing images of claim 2, wherein the second lens has a first aspherical optical surface and a second aspherical optical surface, and the third lens has a first aspherical optical surface.

5. An image capture device comprising, in sequence along an optical axis:
    a prism, being a total reflection prism, wherein the prism is a lens closest to the object and the prism has an incident optical surface, a reflecting surface and an exit optical surface, and wherein the reflecting surface is a mirror surface formed by a total reflection coating;
    a first lens group having negative focal power, and comprising at least one lens having a negative focal power;
    a second lens group having positive focal power, and comprising at least one lens having an aspherical optical surface;
    a third lens group having positive focal power, and comprising at least one lens having positive focal power and at least one lens having negative focal power;
    a fourth lens group having positive focal power, and comprising at least one lens having an aspherical optical surface; and
    an image sensor at an imaging plane of the image capture device so as to image an object, wherein the second lens group has a focal length $f_2$, and the third lens group has a focal length $f_3$, and the image capture device satisfies the following relation:

$0.4 < f_3/f_2 < 0.7$.

6. The image capture device of claim 5, wherein along the optical axis the first lens group comprises a first lens, the second lens group comprises a second lens, the third lens group comprises a third lens, a fourth lens and a fifth lens, and the fourth lens group comprises a sixth lens.

7. The image capture device of claim 6, wherein the first lens has negative focal power, the third lens has positive focal power, and the sixth lens has positive focal power.

8. The image capture device of claim 6, wherein the second lens has a first aspherical optical surface and a second aspherical optical surface, and the third lens has a first aspherical optical surface.

* * * * *